US008908391B2

(12) United States Patent  (10) Patent No.: US 8,908,391 B2
Odell  (45) Date of Patent: Dec. 9, 2014

(54) METHOD AND APPARATUS FOR REGULATING AN ADDITIONAL OUTPUT OF A POWER CONVERTER

(75) Inventor: Arthur B. Odell, Cupertino, CA (US)

(73) Assignee: Power Integrations, Inc., San Jose, CA (US)

( * ) Notice: Subject to any disclaimer, the term of this patent is extended or adjusted under 35 U.S.C. 154(b) by 722 days.

(21) Appl. No.: 12/509,392

(22) Filed: Jul. 24, 2009

(65) Prior Publication Data

US 2011/0018343 A1  Jan. 27, 2011

(51) Int. Cl.
*H02M 3/335*  (2006.01)
*G05F 1/00*  (2006.01)
*G05F 1/577*  (2006.01)

(52) U.S. Cl.
CPC .................................. *H02M 3/33561* (2013.01)
USPC .......................... 363/21.04; 323/266; 323/267

(58) Field of Classification Search
USPC ..................... 363/15, 16, 21.01, 21.04, 21.12; 323/266, 267, 268, 271
See application file for complete search history.

(56) References Cited

U.S. PATENT DOCUMENTS

| | | | | |
|---|---|---|---|---|
| 5,113,333 A | * | 5/1992 | Ou | 363/25 |
| 5,122,728 A | * | 6/1992 | Ashley | 323/282 |
| 5,612,862 A | * | 3/1997 | Marusik et al. | 363/93 |
| 6,490,179 B1 | * | 12/2002 | Boylan et al. | 363/21.06 |
| 7,447,047 B2 | * | 11/2008 | Hsu et al. | 363/21.01 |
| 7,480,158 B2 | * | 1/2009 | Moromizato et al. | 363/21.06 |
| 2006/0062026 A1 | * | 3/2006 | Wittenbreder | 363/21.06 |
| 2008/0084715 A1 | * | 4/2008 | Hsu et al. | 363/21.04 |

FOREIGN PATENT DOCUMENTS

JP  2000-262051  9/2000

* cited by examiner

*Primary Examiner* — Adolf Berhane
*Assistant Examiner* — Henry Lee, III
(74) *Attorney, Agent, or Firm* — Blakely Sokoloff Taylor & Zafman LLP

(57) ABSTRACT

An example post regulator controller for use in a power converter having a regulated output and an additional output is disclosed. The post regulator controller includes an inductor to be coupled between the regulated output of the power converter and a post regulator switch of the power converter. The inductor is to be coupled to drive the post regulator switch with an induced voltage across the inductor to redirect energy from the regulated output to the additional output of the power converter.

28 Claims, 7 Drawing Sheets

METHOD AND APPARATUS FOR REGULATING AN ADDITIONAL OUTPUT OF A POWER CONVERTER

BACKGROUND INFORMATION

1. Field of the Disclosure

The present invention relates generally to an apparatus and method for regulating an additional output of a power converter.

2. Background

Many electrical devices such as cell phones, personal digital assistants (PDA's), laptops, etc. are powered by a source of dc power. Because power is generally delivered through a wall outlet as high-voltage ac power, a device, typically referred to as a power converter or power supply, is required to transform the high-voltage ac power to low-voltage dc power for many electrical devices. In operation, a power converter may use a controller to regulate output power delivered to an electrical device that may be generally referred to as a load. In operation, a controller may control a transfer of energy pulses created by switching a power switch on and off in response to feedback information. In one instance, the feedback information may be used to keep the output voltage at the output of the power converter regulated.

In certain applications, power converters may include an energy transfer element to separate an input side from an output side of the power converter. More specifically, the energy transfer element may provide galvanic isolation which prevents dc current from flowing between the input side (where power is provided) and the output side (where power is delivered) of the power converter and may be required to meet certain safety regulations.

In one example, an isolated power converter may be required to provide additional outputs with a regulated voltage. For example, an isolated power converter used for a computer may require a first regulated output at 5 V and an additional regulated output at 3.3 V. A common method to provide for an additional regulated output voltage is to include a post regulator. More specifically, a post regulator is coupled to the output side of the power converter to redirect energy from a regulated output in order to regulate an additional output. In one example, a post regulator may include a post regulator controller coupled to the output side of the power converter which may switch a switch coupled to the output side of the power converter such that a portion of energy delivered to the main output is redirected to an additional output. The post regulator may control the switching of the post regulator switch to regulate the voltage at the additional output.

In one instance, the post regulator switch that regulates an additional output is implemented as a transistor, and to be more specific, is implemented as a metal oxide semiconductor field effect transistor (MOSFET) to accommodate for practical considerations such as performance and cost. When using a MOSFET to implement the post regulator switch, a substantial voltage may be needed to switch the MOSFET. However, the substantial voltage needed for the MOSFET to switch may not be available at the output side of the power converter. In the case of the example power converter for a computer mentioned above, the substantial voltage to switch the MOSFET may need to be 15 V, and the main output voltage is only at 5V. Thus, additional costs may be incurred for including multiple components for generating an adequate voltage in order to switch the MOSFET of the post regulator.

BRIEF DESCRIPTION OF THE DRAWINGS

Non-limiting and non-exhaustive embodiments and examples of the present invention are described with reference to the following figures, wherein like reference numerals refer to like parts throughout the various views unless otherwise specified.

DETAILED DESCRIPTION

A method and apparatus to post regulate an additional output of a power converter is disclosed in accordance with the teachings of the present invention. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. In addition, it is appreciated that the figures provided herewith are for explanation purposes to persons ordinarily skilled in the art and that the drawings are not necessarily drawn to scale.

According to the teachings of the present invention, a power converter circuit includes a post regulator to regulate an additional output. A post regulator may be defined as a circuit that regulates an output quantity from an already regulated output quantity. In a galvanically isolated power converter, a power converter that prevents the flow of dc current from the input to the output, a post regulator switch may be coupled to the output side to divert a portion of energy being delivered to the main output of the power converter to an additional output. In operation, a post regulator controller is coupled to switch a post regulator switch to regulate a voltage at the additional output. In one instance, the post regulator switch is a "high side" switch. More specifically, a high side switch may defined as a switch that when conducting, the conducting terminals are at potential higher than the lowest potential in the circuit. According to the teachings of the present invention, an inductor is used to drive a high side post regulator switch. In one example, post regulator switch is a MOSFET (metal oxide semiconductor field effect transistor) that requires a voltage of substantial magnitude to drive the high side switch. According to the teachings of the present invention, the substantial voltage may be generated by inducing a voltage across an inductor.

Figure 1:
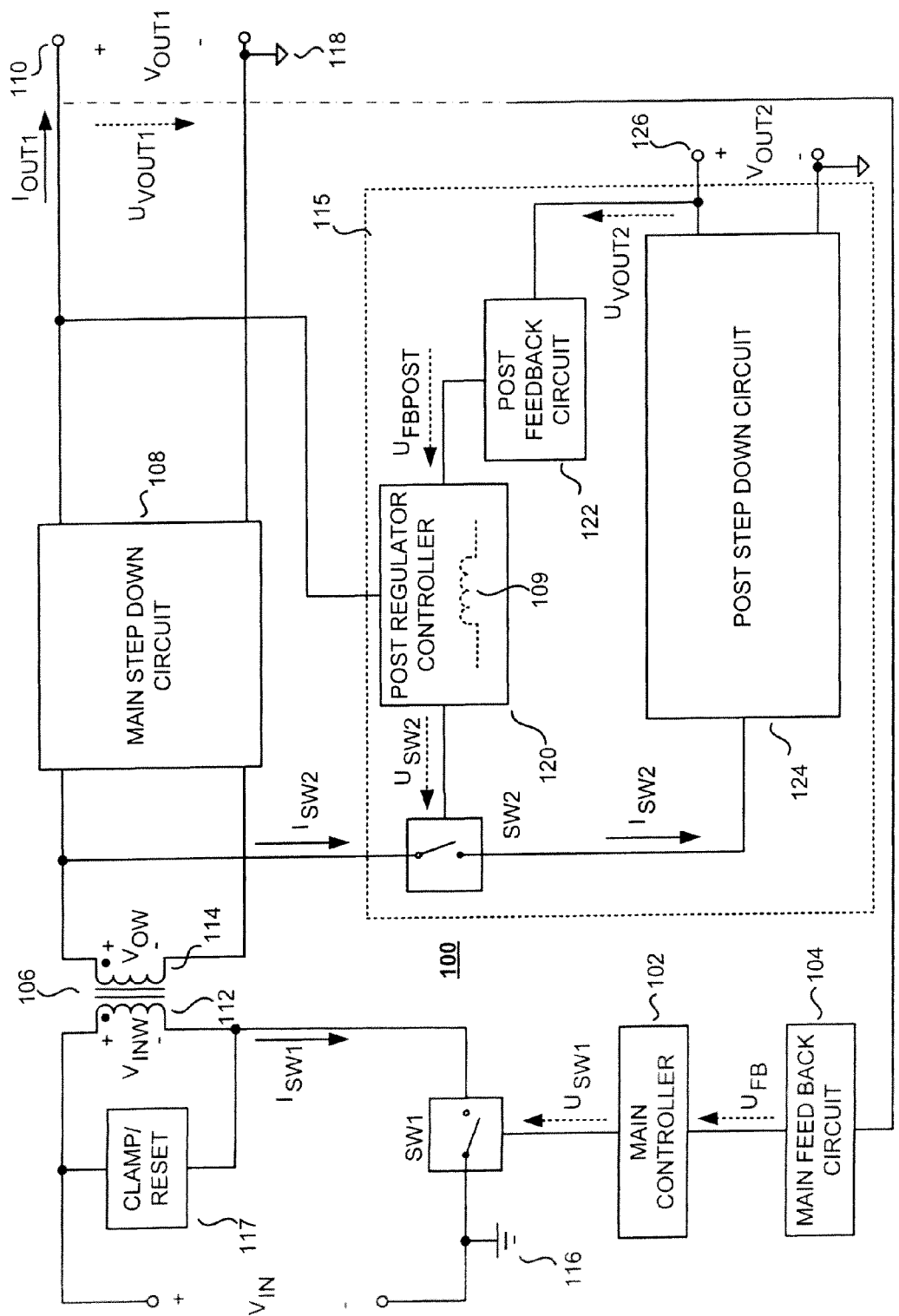
FIG. 1 is an example functional block diagram of a power converter illustrating an example post regulator circuit, in accordance with the teachings of the present invention.

Referring now to FIG. 1, a functional block diagram illustrating an example of a power converter 100 including an additional output 126 is shown in accordance with the teachings of the present invention. As shown, power converter 100 is configured as a forward converter that includes a main controller 102, a main feedback circuit 104, an energy transfer element 106, main step down circuit 108, a main power switch SW1, a post regulation circuit 115, and a clamp circuit 117. In operation, power converter 100 provides output power to a main output 110 from an unregulated dc input voltage $V_{IN}$, from hereon referred to as "input voltage". In operation, power converter 110 may regulate an output current $I_{OUT1}$ or an output voltage $V_{OUT1}$ at main output 110. In the example of FIG. 1, energy transfer element 106 is a transformer, with an input winding 112 and an output winding 114. In one example, energy transfer element 106 may provide galvanic isolation. More specifically, galvanic isolation prevents dc current from flowing between the input side and the output side of power converter 100, and is usually required to meet safety regulations. As shown, an input return 116 is electrically coupled to circuitry being referenced to the 'input side' of power converter 100. Similarly, an output return 118 is electrically coupled to circuitry being referenced to the 'output' side of power converter 100. Main feedback circuit 104 may include circuitry that is galvanically isolated and will be discussed in further detail in conjunction with FIG. 2.

As shown, primary winding 112 is coupled to main power switch SW1. In operation, main power switch SW1 may be switched between an 'ON' state, thereby allowing switch current $I_{SW1}$ to be conducted through main power switch SW1, and an 'OFF' state, thereby substantially preventing current from being conducted through main power switch SW1. In operation, energy transfer element 106 transfers energy when main power switch SW1 is in an ON state and substantially prevents energy transfer element 106 from transferring energy when main power switch SW1 is in an OFF state. In one example, main power switch SW1 is a 'low side' switch because both conducting terminals of power switch SW1 are at substantially its at the lowest potential in the circuit when power switch SW1 is conducting. As further shown, main controller 102 outputs a main switching signal $U_{SW1}$ to switch main power switch SW1 between an ON state and an OFF state. In one example, main controller 102 may operate switch SW1 to regulate the output voltage $V_{OUT1}$ at output 110 to a desired value. In another example, main controller 102 includes an oscillator (not shown) that defines substantially regular switching periods $T_S$ during which switch SW1 is in an ON state and an OFF state. More specifically, regulation of output voltage $V_{OUT1}$ is accomplished by controlling a duty factor of the main power switch SW1 in response to a feedback signal $U_{FB}$. The fraction of the switching period $T_S$ when switch SW1 is in an ON state is known as the duty factor. In one example, main controller 102 may vary switching period $T_S$ to control the duty factor of main power switch SW1. In another example, switching period $T_S$ may remain constant and the ON state during a switching period $T_S$ may be varied to control the duty factor of main power switch SW1. In one example, main power switch SW1 is a metal oxide semiconductor field effect transistor (MOSFET). In one example, main power switch SW1 and main controller 102 may be implemented as a monolithic integrated circuit or may be implemented with discrete electrical components or a combination of discrete components and integrated circuits.

In operation, main switch SW1 switches to an ON state allowing switch current $I_{SW1}$ to flow through main switch SW1 and causing output winding 114 of transformer 106 to produce an output winding voltage $V_{OW}$ proportional to an input winding voltage $V_{INW}$, in accordance with the operating principles of a transformer. When main switch SW1 switches to an OFF state, clamp circuit 117 limits the voltage $V_{INW}$ across input winding 112. As shown, main step down circuit 108 receives energy from output winding 114 to deliver a constant output voltage $V_{OUT1}$ or a constant output current $I_{OUT1}$ at the output 110 of power converter 100. As further shown, post regulation circuit 115 includes a post regulator controller 120, post feedback circuit 122, post step down circuit 124, and a post regulator switch SW2.

In operation, post regulator switch SW2 selectively allows for a portion of energy from the output side of power converter 100 to be redirected to an additional output 126. More specifically, post regulator switch SW2 switches between an ON state that permits a portion of energy from the output side of power converter 100 to be delivered to additional output 126 and an OFF state that prevents energy from being delivered to additional output 126. According to the teachings of the present invention, post regulator switch SW2 is a 'high side' switch. In other words, when post regulator switch SW2 is conducting, both conducting terminals are potentially higher than the lowest potential in the circuit, output return 118. As shown, post feedback circuit 122 is coupled to additional output 126 and receives an output voltage signal $U_{VOUT2}$ which is representative of the output voltage $V_{OUT2}$. As shown, post feedback circuit 122 is coupled to post regulator controller 120. During operation, feedback circuit 122 outputs a post feedback signal $U_{FBPOST}$ to post regulator controller 120 that is representative of an error voltage. In one example, an error voltage may be the difference between a desired voltage at additional output 126 and the sensed output voltage $V_{OUT2}$ at additional output 126. In response to receiving post feedback signal $U_{FBPOST}$, post regulator controller 120 outputs a switching signal $U_{SW2}$ that controls the switching of post regulator switch SW2 in response to post feedback signal $U_{FBPOST}$. More specifically, post regulator controller 120 includes an inductor 109 that functions as a temporary current source to provide a voltage sufficient to facilitate switching of switch SW2. In this manner, post regulator controller 120 regulates output voltage $V_{OUT2}$.

In one example, post regulator switch SW2 may only be switched to an ON state if main power switch SW1 is in an ON state. Therefore, post regulator switch SW2 may only be in an ON state for a portion of the time that main power switch SW1 is in an ON state during a switching period $T_S$. In another example, regulation of output voltage $V_{OUT2}$ may be limited to a maximum voltage depending on at least the load requirements of the main output 110 and the additional output 126. More specifically, the maximum regulated voltage at additional output 126 may be limited depending on the power converters capability to deliver an adequate amount energy to the additional output 126 to regulate the output voltage $V_{OUT2}$. In one embodiment according to the teaching of the present invention, post regulator switch SW2 may regulate output voltage $V_{OUT2}$ by setting the duty ratio of SW2 to an ON state during every switching period $T_S$, thus eliminating the need for post feedback circuit 122. In another embodiment according to the teachings of the present invention, post regulator controller 120 may implement, but is not limited to ON/OFF control technique to regulate the output voltage $V_{OUT2}$ at additional output 126.

Figure 2:
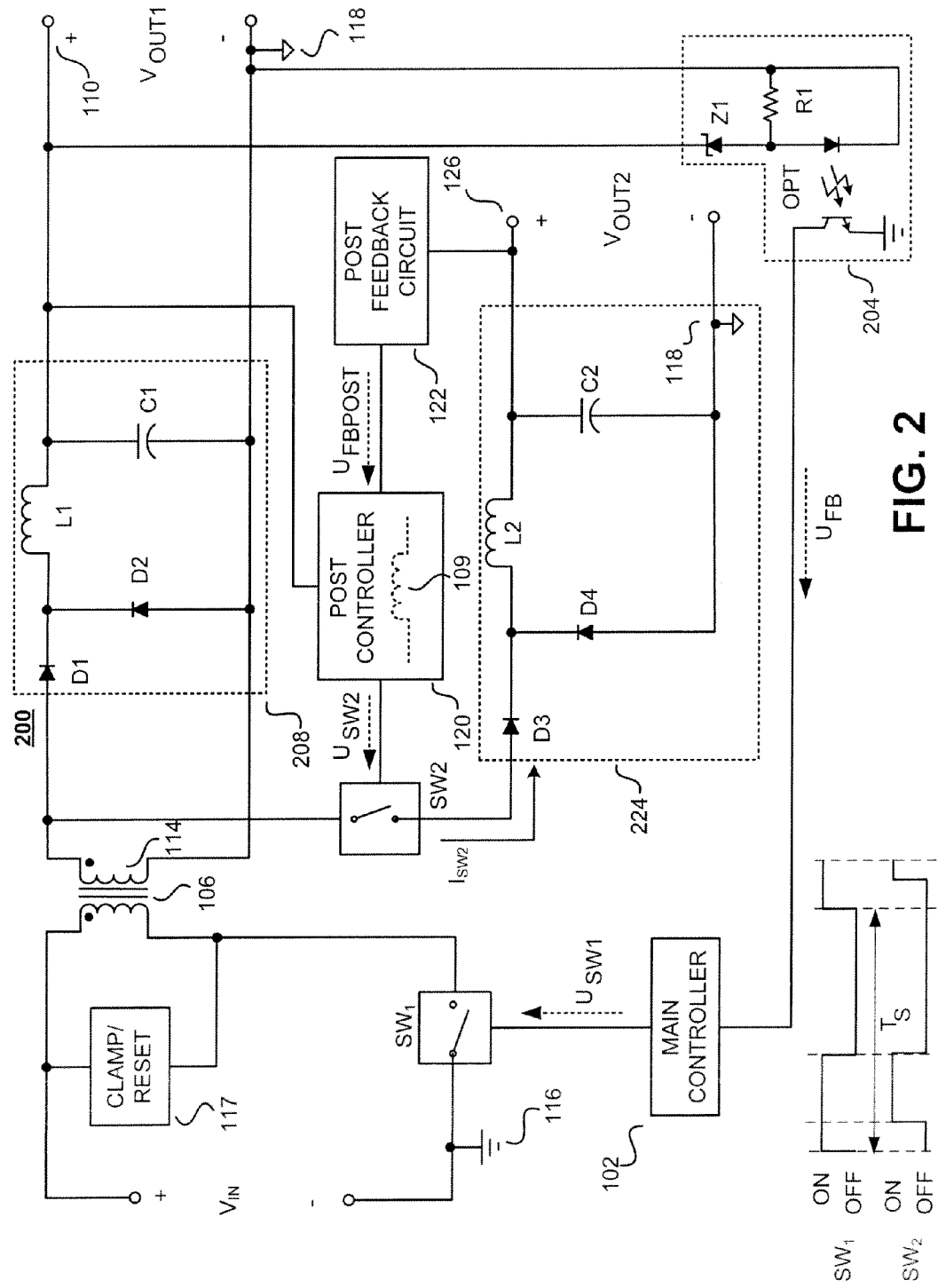
FIG. 2 is an example functional block diagram of a power converter further illustrating an example main step down circuit, an example post step down circuit, and an example main feedback circuit, in accordance with the teachings of the present invention.

Referring now to FIG. 2, a functional block diagram of an example power converter 200 illustrating an example post step down circuit 224 and example main feedback circuit 204 is shown in accordance with the teachings of the present embodiment. In one example post step down circuit 224 and main feedback circuit 204 are possible implementations of post step down circuit 124 and main feedback circuit 104 of FIG. 1, respectively. As shown, post step down circuit 224 includes a diode D3, a diode D4, an inductor L2, and a capacitor C2. As is further shown, diode D3 is coupled to post regulator switch SW2. In one example, post step down circuit 224 functions in a similar manner to main step down circuit 108. In operation, diode D3 allows current to flow in one direction through inductor L2. Freewheeling diode D4, inductor L2 and capacitor C2 filter the voltage received from output winding 114 to produce output voltage $V_{OUT2}$ at additional output 126.

In one possible implementation, main feedback circuit 204 includes a Zener diode Z1 and an impedance R1 coupled to an optical coupler OPT. In operation, Zener diode Z1 provides optical coupler OPT with a current representative of main output voltage $V_{OUT1}$. In operation, optical coupler OPT converts a current to an optical signal and then back to a current to galvanically isolate the input side and output side of power converter 100. In this manner, optical coupler OPT provides feedback information from additional output 118 in order to determine the appropriate amount of delivered from the input side of the power converter.

Figure 3A:
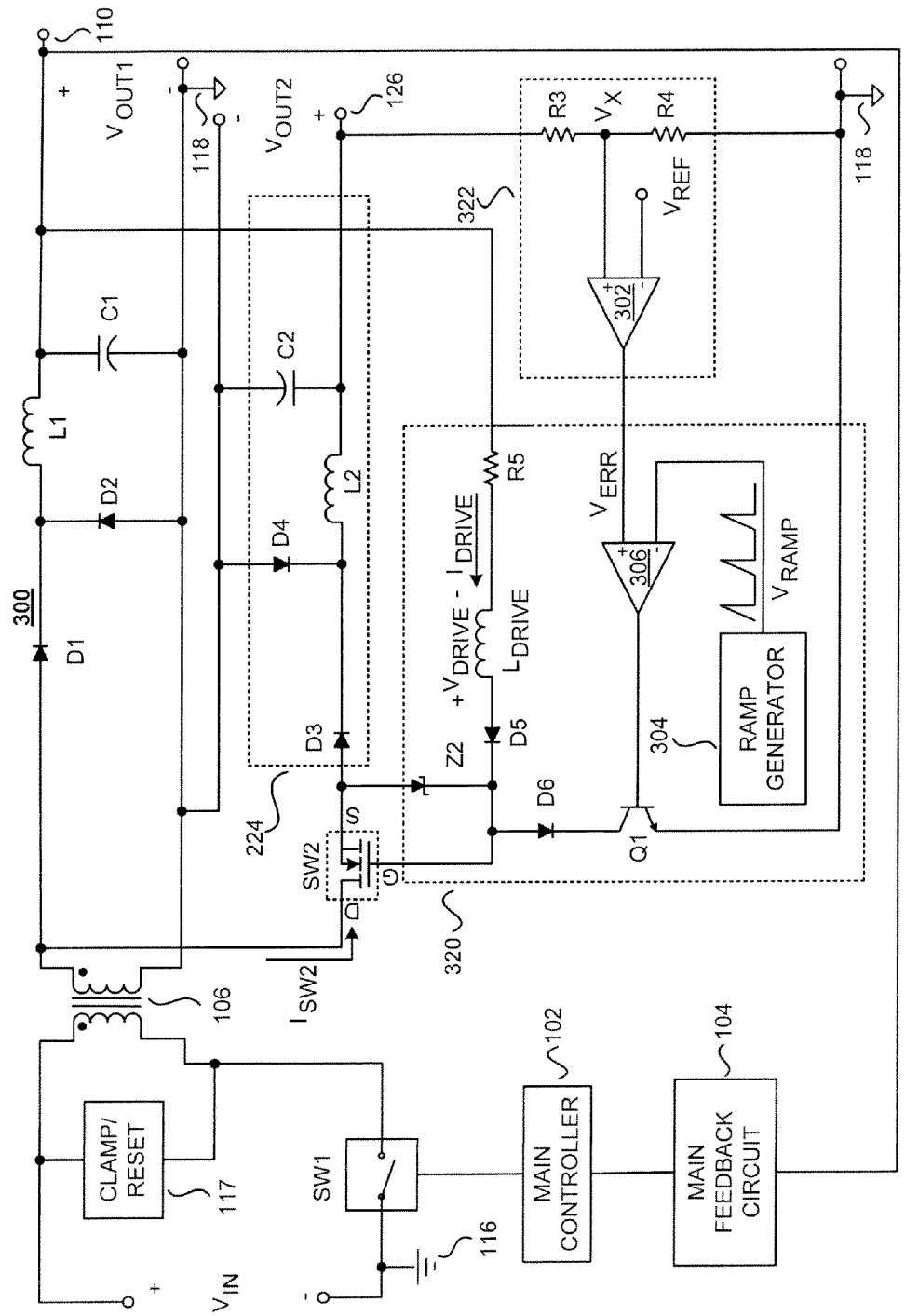
FIG. 3A is an example functional block diagram of a power converter further illustrating an example post regulator controller and an example post feedback circuit, in accordance with the teachings of the present invention.

Referring now to FIG. 3A, a functional block diagram illustrates a power converter 300 including an example post regulator controller 320 and an example post feedback circuit 322 in accordance with the teachings of the present invention. In one example, post regulator controller 320 and post feedback circuit 322 are possible implementations of post regulator controller 120 and post feedback circuit 122 of FIG. 1, in accordance with the teachings of the present invention. In one example, post feedback circuit 322 includes resistors R3 and R4, and a comparator 302. As shown, resistor R3 and resistor R4 are coupled to form a voltage divider between additional output 126 and output return 118. As shown, non inverting input of comparator 302 is coupled at a node $V_X$ between resistor R3 and R4. In operation, additional output voltage $V_{OUT2}$ is divided down at node $V_X$. Comparator 302 compares a proportional output voltage $V_X$ (divided down from $V_{OUT2}$) with a reference voltage $V_{REF}$ to produce error voltage $V_{ERR}$.

As shown, example post regulator controller 320 includes, a drive inductor $L_{DRIVE}$, a transistor Q1, diodes $D_5$ and D6, a resistor R5, a Zener diode Z2, a ramp generator 304, and a comparator 306. As shown, comparator 306 receives error voltage $V_{ERR}$ at a non-inverting input. A ramp generator generates a ramped voltage $V_{RAMP}$ and is received by inverting input of comparator 306. In operation, when ramped voltage $V_{RAMP}$ exceeds error voltage $V_{ERR}$, comparator 306 outputs a logic low signal to turn transistor Q1 to an OFF state. As shown, transistor Q1 is a bipolar junction transistor. In one example, transistor Q1 may be, but not limited to, a MOSFET. When transistor Q1 is switched to an OFF state, drive current $I_{DRIVE}$ is abruptly prevented from conducting through transistor Q1. This action, allows drive inductor $L_{DRIVE}$ to function as a temporary current source that provides a sufficient charge to a gate to switch switch $SW_2$. This allows a drive voltage $V_{DRIVE}$ to develop across inductor $L_{DRIVE}$. In operation, Zener diode Z2 limits the voltage at gate G to a break down voltage of Zener diod Z2. In one example, the value of Zener diode Z2 will be selected such that the breakdown voltage across Zener diode will be greater than a gate G to source S threshold voltage for power switch SW2. Therefore, the value of the drive voltage $V_{DRIVE}$ will be limited to a breakdown voltage of Zener diode Z2. In this manner, the drive voltage $V_{DRIVE}$ across drive inductor $L_{DRIVE}$ drives, or in other words, switches post regulator switch from an OFF state to an ON state. Similarly, when transistor Q1 is switched to an ON state when $V_{RAMP}$ drops below error voltage $V_{ERR}$, drive current $I_{DRIVE}$ is now again able to conduct through transistor Q1. This causes the gate G of post regulator switch SW2 to discharge, therefore allowing the voltage on gate G to drop down to substantially the voltage at output return 118. In this manner, post regulator switch SW2 is turned to an OFF state when the voltage at gate G of power switch is brought down below the gate G to source S voltage threshold of post regulator switch SW2. As shown, resistor R5 is coupled to one end of drive inductor to increase impedance for drive current $I_{DRIVE}$ flowing through drive inductor $L_{DRIVE}$ during the ON state of transistor Q1. As further shown, diode D5 is coupled between the drive inductor $I_{DRIVE}$ and switch SW2. In operation, diode D5 allows for the voltage on gate G of post regulator switch SW2 to sustain a voltage greater than a gate to source threshold of the post regulator SW2 even after drive current $I_{DRIVE}$ has gone to zero.

Figure 3B:
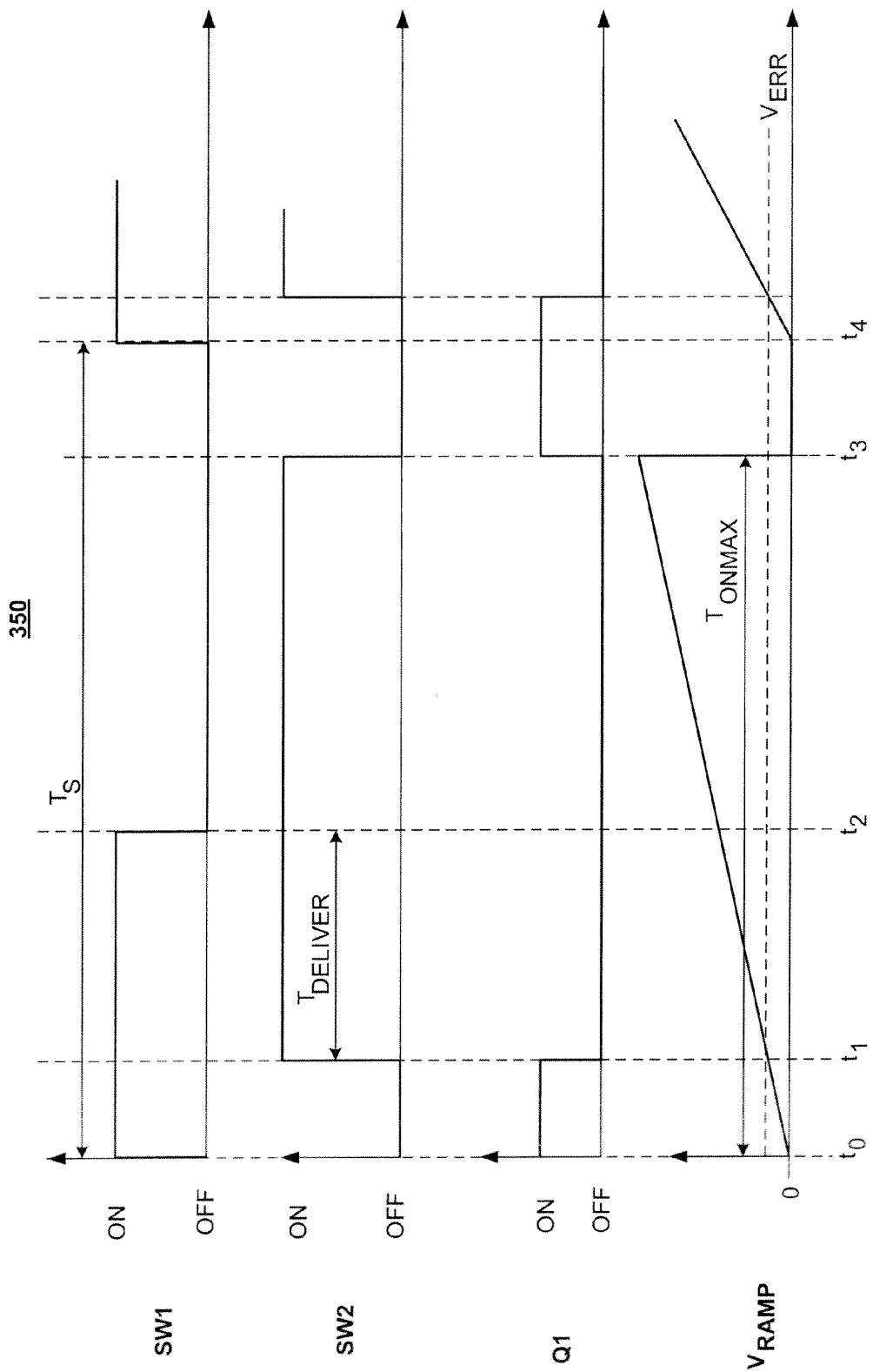
FIG. 3B is an example timing diagram that illustrates the operation of the power converter of FIG. 3A, in accordance with the teachings of the present invention.

Referring now to FIG. 3B, a timing diagram 350 further illustrates the relationship between switching signals and ramp generator 304 of FIG. 3A in accordance with the teachings of the present invention. As shown, at a time to power switch SW1 switches from an OFF state to an ON state denoting the beginning of a new switching period $T_S$. At this time, ramp generator 304 outputs a ramping voltage $V_{RAMP}$ that starts at substantially zero volts. At a time $t_1$, post regulator switch SW2 switches from an OFF state to an ON state in response to ramping voltage $V_{RAMP}$ reaching error voltage $V_{ERR}$. As shown, ramping voltage $V_{RAMP}$ may be designed to ramp up for a substantial portion of switching period $T_S$. As shown in FIG. 3B, when ramping voltage $V_{RAMP}$ reaches error voltage $V_{ERR}$, transistor Q1 is turned to an OFF state and causes post regulator switch SW2 to switch an ON state. In one example, voltage $V_{RAMP}$ is a fixed ramp and may extend for a time period $T_{ONMAX}$ that is a substantial portion of switching period $T_S$ to allow post regulator switch SW2 to increase range of maximum duty factor. In other words, maximum time period $T_{ONMAX}$ of voltage ramp VRAMP functions as a maximum limit post regulator switch SW2 may be in an ON state during a switching period $T_S$. At a time $t_2$, main power switch SW1 is switched to an OFF state. Although, post regulator switch SW2 remains in the ON state, at time $t_2$ post regulator switch SW2 no longer conducts post regulator switch current SW2. Therefore, even when SW2 remains ON the energy delivered to post regulator output 126 is limited by the main switch SW1 switching from an OFF state to an ON state. As shown, a time $T_{DELIVER}$ is denoted as the time when post regulator switch SW2 is conducting and delivering energy to additional output 126. At a time $t_3$, voltage $V_{RAMP}$ goes to zero, Q1 switches to an ON state, and post regulator switch SW2 switches to an OFF state. Referring back to FIG. 3A, in operation when voltage $V_{RAMP}$ goes to zero, comparator 306 outputs a logic high signal that switches Q1 to an ON state. This causes the voltage at gate G of post regulator SW2 to drop below the gate G to source S threshold and switches post regulator switch SW2 to an OFF state.

Figure 4A:
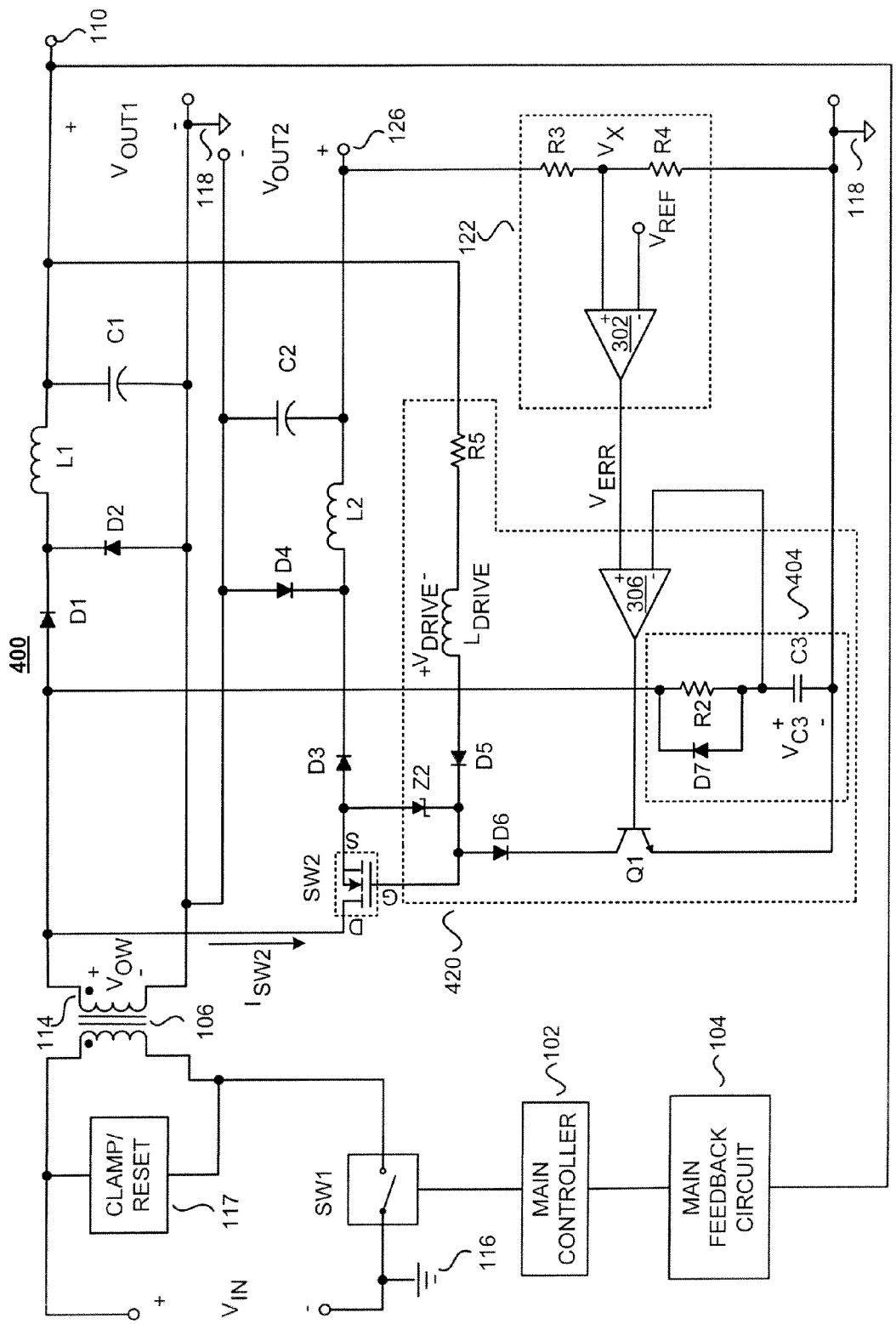
FIG. 4A is an example functional block diagram of a power converter further illustrating an example ramp generator, in accordance with the teachings of the present invention.

Referring now to FIG. 4A, a functional block diagram illustrates a power converter 400 including an example ramp generator 404 in a post regulator controller 420 in accordance with the teachings of the present invention. As shown, post regulator controller 420 and ramp generator 404 are possible implementations of post regulator controller 320 and ramp generator 304, respectively. As shown, ramp generator 404 includes a diode D7, resistor R2 and a capacitor C3. As shown, capacitor C3 is coupled to inverting input of comparator 306. As is further shown, diode D7 is coupled across resistor R2 to provide a reset application. More specifically, the reset application allows for a resetting of the voltage on capacitor C3 when SW1 turns OFF during each switching period $T_S$. In operation, when main power switch SW1 is in an ON state, output winding voltage $V_{OW}$ is a positive voltage with respect to output return 118 and capacitor C3 charges to a voltage $V_{C3}$. As shown, resistor R2 provides an impedance to allow capacitor C3 to charge at some rate that allows voltage $V_{C3}$ to ramp upwards. When voltage $V_{C3}$ exceeds error Voltage $V_{ERR}$ comparator 306 outputs a low logic signal that switches transistor Q1 to an OFF state. Voltage $V_{C3}$ across capacitor C3 is set back to zero when output winding voltage $V_{OW}$ becomes a negative voltage with respect to output return 118. More specifically, output winding voltage becomes a negative voltage when main power switch SW1 switches from an ON state to an OFF state. More specifically, when switch SW1 switches to an OFF state, thus causing output winding voltage VOW to become negative, diode D7 becomes forward biased and provides a path of substantially zero resistance for capacitor C3 to be discharged though, or in other words reset back to 0 V. In this manner, capacitor C3 resets a ramp signal during every switching period $T_S$. In one example, ramp generator 304 may function as an integrator that integrates the output winding voltage $V_{OW}$ during the ON state of main power switch SW1. This allows ramp generator 304 to adjust the rate at which capacitor C3 charges in response to the input voltage $V_{IN}$. In other words, ramp generator may also function as an integrator that allows post regulator switch SW2 to switch in response to a feed forward signal that is representative of the output winding voltage $V_{OW}$.

Figure 4B:
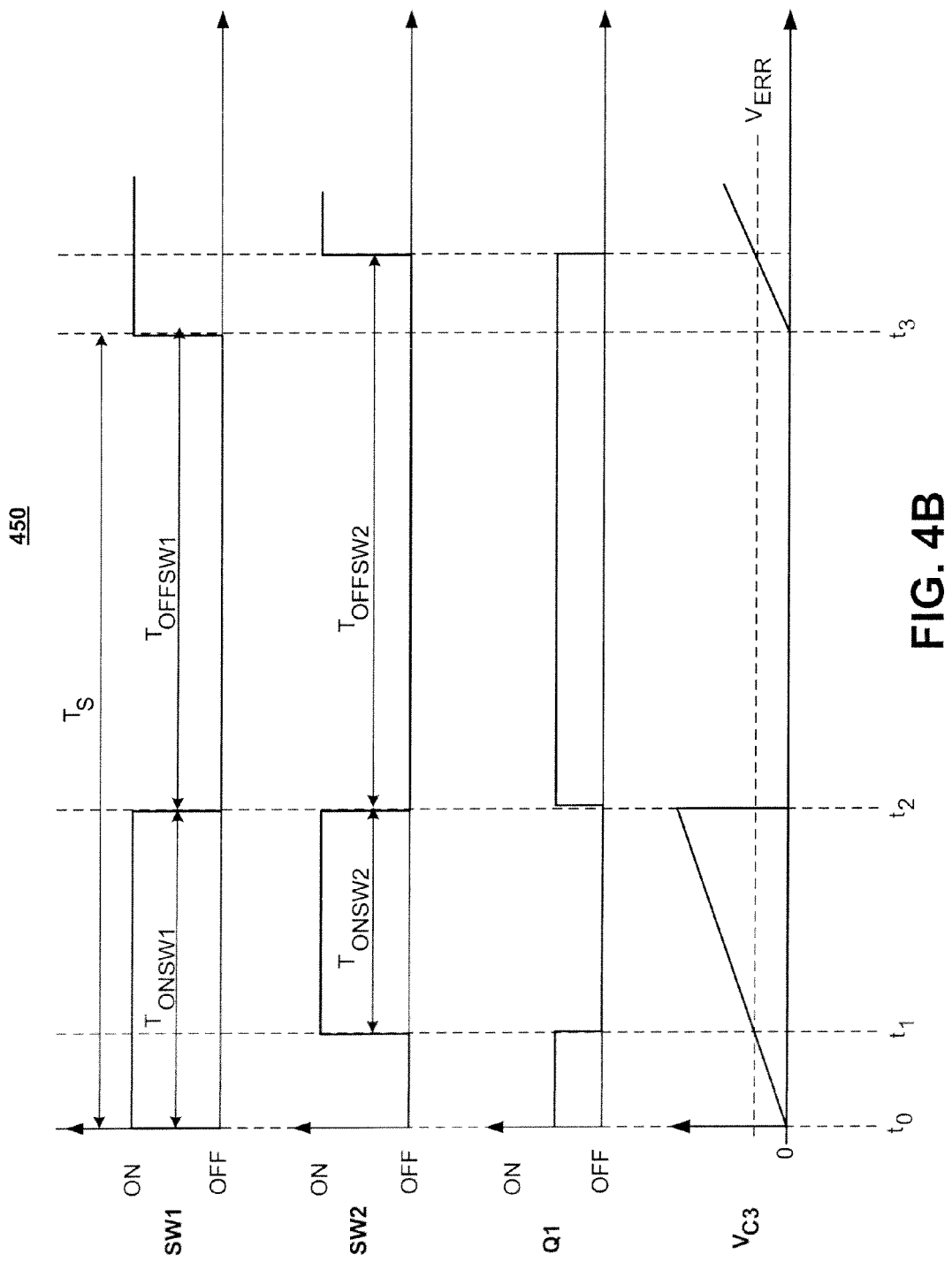
FIG. 4B is an example timing diagram that illustrates the operation of the power converter of FIG. 3B, in accordance with the teachings of the present invention.

Referring now to FIG. 4B, a timing diagram 450 of power converter 400 of FIG. 4A further illustrates the relationship between switching signals and ramp generator 404 in accordance with the teachings of the present invention. As shown, at a time to power switch SW1 switches from an OFF state to an ON state denoting the beginning of a new switching period $T_S$. Furthermore, a voltage $V_{C3}$ across capacitor C3 begins to ramp upward at a time $t_0$. At a time $t_1$, voltage $V_{C3}$ reaches error voltage $V_{ERR}$ which results in the switching of transistor Q1 to an OFF state, which further results in post regulator switch SW2 switching to an ON state. In one example, an on time $T_{ONSW1}$ representative of the on time of main power switch SW1 may be significantly shortened in response to a increase an input voltage $V_{IN}$. In this instance the on time $T_{ONSW2}$, may be adjusted by shifting the leading edge of the on time $T_{ONSW2}$ in response to the input voltage $V_{IN}$ to prevent the truncating on time $T_{ONSW2}$. Referring back to FIG. 4A, when input voltage $V_{IN}$ increases, the rate at which C3 charges increases, which allows for transistor Q1 to turn off sooner, thus shifting the leading edge of the on time $T_{ONSW2}$.

As shown, at a time $t_2$, main switch SW1 switches from an ON state to an OFF state and post regulator switch switches from an ON state to an OFF state. During operation of power converter 400, at time t2, output winding voltage $V_{OW}$ becomes negative allowing diode D7 to become forward bias and resetting voltage $V_{C3}$ across capacitor C3 to zero. As a result, transistor Q1 is switched to an ON state which in turn shorts gate G of post regulator switch SW2 to output return 118 and switches post regulator switch SW2 to an OFF state. As shown, the duty factor of post regulator switch SW2 may be controlled by modulating a leading edge of the on time $T_{ONSW2}$. At a time t3, main power switch SW1 switches from an OFF state to an ON state based on regulation of main power controller 102 which signifies the end of switching period $T_S$.

Figure 5:
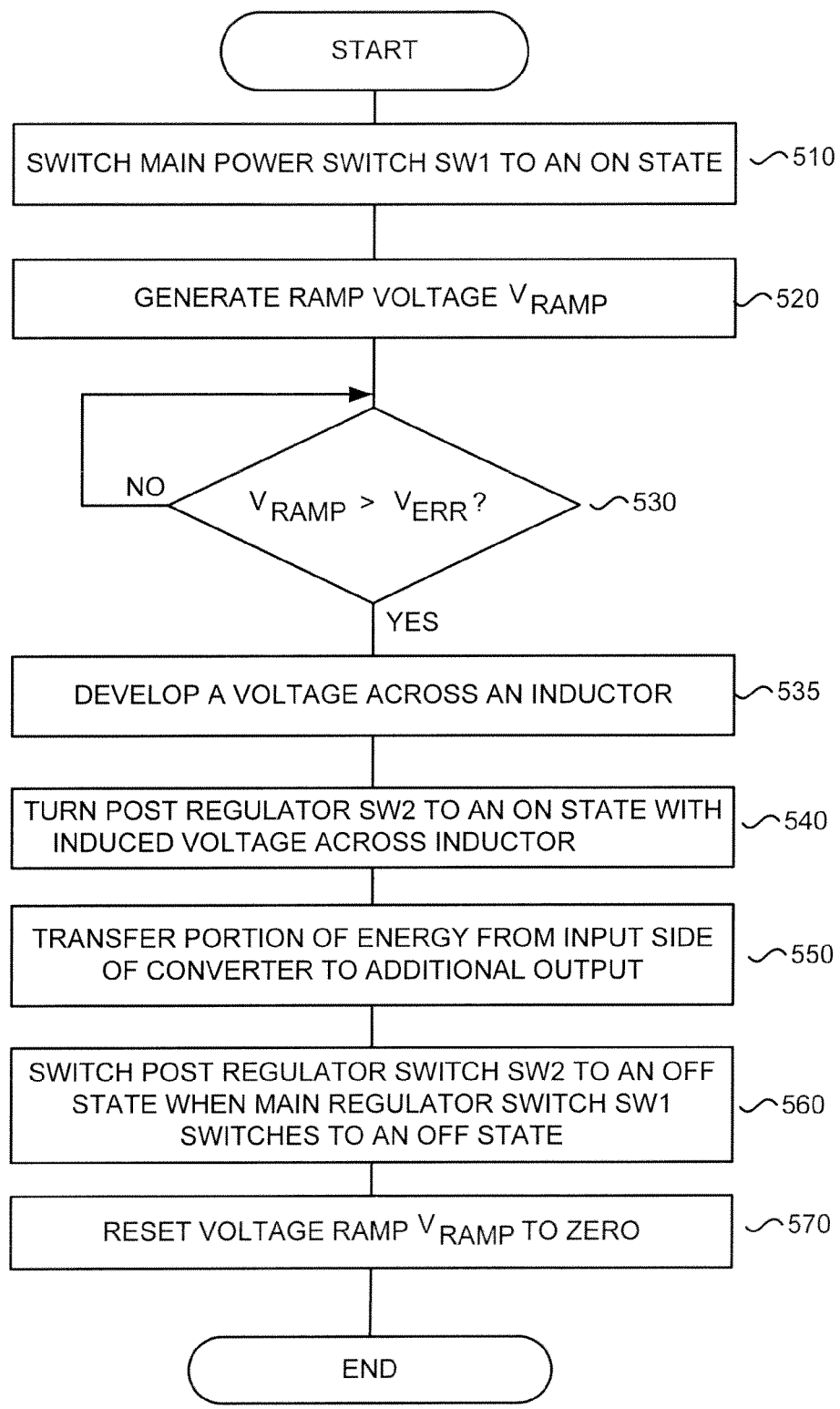
FIG. 5 is a flow chart illustrating a method to operate a post regulation circuit using an inductor to drive a post regulation switch, in accordance with the teachings of the present invention.

Referring now to FIG. 5, a flow chart 500 illustrates a method to post regulate an additional output of a power converter. More specifically, flowchart 500 illustrates a method for using an inductor to drive a post regulator switch to regulate an additional output of a power converter. In process block 510, a main switch of a power converter is switched to ON state allowing energy to be delivered from an input side to an output side of a galvanically isolated power converter. In process block 520, a voltage ramp $V_{RAMP}$ is generated and will be used to determine when a post regulator switch switches to an ON state to regulate energy to an additional output of a power converter. In decision block 530, when a ramp voltage $V_{RAMP}$ is greater than an error voltage $V_{ERR}$ representative of the additional output voltage, decision block 530 proceeds to process block 535. A drive inductor coupled to the post regulator switch develops a substantial voltage across a drive inductor. In process block 540, the post regulator switch is switched, or in other words 'driven', to an ON state by voltage generated by the drive inductor. In process block 550, a portion of energy delivered from the input side of a power converter is transferred to the additional output at the output side of the power converter. In process block 560, the post regulator switch switches to an OFF state in response to the main regulator switch switching to an OFF state, thereby preventing substantially any energy from being delivered to the output side of the power converter and thus the additional output. In one example, post regulator switch is switched to an OFF state when a gate of post regulator switch SW2 is discharged to an output return. In process block 570, an output winding voltage is coupled to a voltage ramp generator to reset the voltage ramp $V_{RAMP}$ to substantially zero for the next switching period.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A post regulator controller for use in a power converter having a regulated output and an additional output, the controller comprising:
    a transistor coupled to be switched between an OFF state and an ON state in response to an error signal that is representative of the additional output; and
    an inductor coupled to the transistor and to be coupled to the regulated output of the power converter to generate a drive current through the inductor from the regulated output through the transistor to an output return when the transistor is in the ON state, wherein the drive current is prevented from conducting through the transistor and a drive voltage develops across the inductor in response to the transistor switching to the OFF state, wherein the inductor is to be coupled to provide a sufficient charge to a gate terminal of a post regulator switch when the transistor is in the OFF state to enable the post regulator switch to redirect energy from the regulated output to the additional output of the power converter, wherein, when the post regulator switch is enabled, a switch current flows from the regulated output through the post regulator switch to the additional output.

2. The post regulator controller of claim 1, further comprising a zener diode to be coupled across a source terminal and the gate terminal of the post regulator switch.

3. The post regulator controller of claim 2, wherein the post regulator switch is a metal oxide semiconductor field effect transistor (MOSFET) and wherein the zener diode has a breakdown voltage that is greater than a gate to source threshold voltage of the post regulator switch.

4. The post regulator controller of claim 2, wherein a portion of the drive current flows through the zener diode when the transistor is in the OFF state.

5. The post regulator controller of claim 1, further comprising:
a comparator coupled to receive a post feedback signal representative of the additional output of the power converter; and
a ramp generator coupled to provide a ramped voltage to the comparator, wherein the comparator is further coupled to switch the transistor to the OFF state to enable the post regulator switch in response to the ramped voltage exceeding the post feedback signal.

6. The post regulator controller of claim 1, wherein the post regulator controller switches the post regulator switch in response to an input voltage of the power converter.

7. The post regulator controller of claim 1, further comprising an integrator to integrate an input voltage of the power converter to adjust an on time of post regulator switch.

8. A post regulation circuit for use in a power converter having a regulated output and an additional output, the regulation circuit comprising:
a post regulator switch to be coupled to redirect energy from the regulated output to the additional output of the power converter, wherein, when the post regulator switch in enabled, a switch current flows from the regulated output through the post regulator switch to the additional output;
a post regulator controller coupled to control the post regulator switch, wherein the post regulator controller includes:
a transistor coupled to be switched between and OFF state and ON state in response to an error signal that is representative the additional output; and
an inductor to be coupled to the transistor and to be coupled to the regulated output of the power converter to generate a drive current through the inductor from the regulated output through the transistor to an output return when the transistor is in the ON state, wherein the drive current is prevented from conducting through the transistor and a drive voltage develops across the inductor in response to the transistor switching to the OFF state, wherein the inductor is coupled to provide a sufficient charge to a gate terminal of the post regulator switch when the transistor is in the OFF state to enable the post regulator switch.

9. The post regulation circuit of claim 8, further comprising post step down circuitry coupled to the post regulator switch to generate an output voltage at the additional output.

10. The post regulation circuit of claim 8, further comprising a zener diode coupled across a source terminal and the gate terminal of the post regulator switch.

11. The post regulation circuit of claim 8, wherein the post regulator switch is a metal oxide semiconductor field effect transistor (MOSFET) and wherein the zener diode has a breakdown voltage that is greater than a gate to source threshold voltage of the post regulator switch.

12. The post regulation circuit of claim 8, further comprising a post feedback circuit coupled between the additional output and the post regulator controller to generate a post feedback signal representative of the additional output of the power converter, wherein the drive voltage across the inductor is generated in response to the post feedback signal.

13. The post regulation circuit of claim 8, wherein the post regulator controller switches the post regulator switch in response to an input voltage of the power converter.

14. The post regulation circuit of claim 8, wherein the post regulator controller further comprises an integrator to integrate an input voltage of the power converter to adjust an on time of post regulator switch.

15. A power converter, comprising:
an energy transfer element coupled to transfer energy between an input side and an output side of the power converter;
a main regulator circuit coupled to the output side of the power converter and coupled to provide a first output voltage at a regulated output of the power converter;
a main power switch coupled to the input side of the power converter;
a main controller coupled to control the main power switch to regulate the first output voltage of the power converter;
a post regulator switch coupled to the output side of the power converter to redirect energy from the regulated output to an additional output of the power converter, wherein, when the post regulator switch is enabled, a switch current flows from the regulated output through the post regulator switch to the additional output; and
a post regulator controller coupled to control the post regulator switch, wherein the post regulator controller includes:
a transistor coupled to be switched between an OFF state and ON state in response to an error signal that is representative of the additional output; and
an inductor coupled to the transistor and to be coupled to the regulated output of the power converter to generate a drive current through the inductor from the regulated output through the transistor to an output return when the transistor is in the ON state, wherein the drive current is prevented from conducting through the transistor and a drive voltage develops across the inductor in response to the transistor switching to the OFF state, wherein the inductor is coupled to provide a sufficient charge to a gate terminal of the post regulator switch when the transistor is in the OFF state to enable the post regulator switch.

16. The power converter of claim 15 wherein an amount of time that energy is redirected from the regulated output to the additional output is less than an amount of time that the main power switch is in an ON state for each switching cycle of the main power switch.

17. The power converter of claim 15, wherein the input side and the output side of the power converter are galvanically isolated.

18. The power converter of claim 15, wherein the post regulator controller switches the post regulator switch in response to an input voltage of the power converter.

19. The power converter of claim 15, wherein the post regulator switch switches from the ON state to the OFF state when the main power switch switches from the ON state to the OFF state.

20. The power converter of claim 15, wherein the post regulator controller includes an integrator to integrate an input voltage of the power converter to adjust an on time of post regulator switch.

21. The power converter of claim 15, wherein the post regulator controller switch is a metal oxide semiconductor field effect transistor (MOSFET) and wherein the power converter further includes a zener diode coupled between the gate terminal and a source of the post regulator switch.

22. The power converter of claim 15, further comprising:
a comparator coupled to receive a post feedback signal representative of the additional output of the power converter;
a ramp generator coupled to provide a ramped voltage to the comparator, wherein the comparator is further coupled to switch the transistor to the OFF state to enable the post regulator switch in response to the ramped voltage exceeding the post feedback signal.

23. The post regulator controller of claim 22, wherein the ramp generator includes a diode coupled to reset the ramp generator when the main power switch switches from the ON state to the OFF state.

24. The post regulator controller of claim 1, wherein the power converter includes step down circuit that receives energy from an output winding a transformer and provides the regulated output in response thereto, wherein the inductor is coupled to an output side of the step down circuit to receive the regulated output.

25. The post regulation circuit of claim 8, wherein the power converter includes a step down circuit that receives energy from an output winding of a transformer and provides the regulated output in response thereto, wherein the inductor is coupled to an output side of the step down circuit to receive the regulated output.

26. The power converter of claim 15, wherein the energy transfer element is a transformer having an output winding, wherein the main regulator circuit receives energy from the output winding to provide the regulated output in response thereto, and wherein the inductor is coupled to an output side of the regulator circuit to receive the regulated output.

27. The post regulator controller of claim 1, wherein the controller is to be coupled to receive an error voltage from a feedback circuit, wherein the error voltage is a difference between a desired voltage at the additional output and a sensed voltage a the additional output, and wherein the post regulator controller control generating the drive voltage across the inductor in response to the error voltage.

28. The post regulator controller of claim 1, further comprising a diode having an anode coupled to the inductor and cathode coupled to the gate terminal of the post regulator switch, wherein the diode is couple between the inductor and the gate terminal of the post regulator switch such that the drive current flows through the diode to allow a voltage on the gate of the post regulator switch to sustain a voltage greater than a gate-to-source threshold of post regulator switch.

* * * * *